** 2,999,832
METHOD OF MANUFACTURING DYED, HARDENED, RESINOUS PRODUCTS OF CONDENSATES
Gerhard Faerber, Rheinberg, Rhineland, Germany, assignor to Deutsche Solvay-Werke G.m.b.H., Solingen-Ohligs, Germany
No Drawing. Filed Mar. 5, 1957, Ser. No. 643,939
Claims priority, application Germany Apr. 27, 1956
22 Claims. (Cl. 260—37)

The invention concerns a method of manufacturing dyed, hardened, resinous products of condensates which are obtained from epichlorhydrin or dichlorhydrin and one or more polyvalent alcohols and/or phenols. These condensates, as is known, are prepared by mixing epichlorhydrin or dichlorhydrin in an alkaline medium with polyvalent alcohols or phenols. Bis-(4-oxyphenol)-2:2-propane is principally used. However, other bi-valent phenols may also be used such as resorcin, hydroquinone, 4:4-dioxybenzophenone, bis-(4-oxyphenyl)-1:1-ethane, bis-(4-oxyphenyl)-1:1-isobutane and bis-(4-oxyphenyl)-2:2-butane.

In the case of the condensates unbranched molecules of the general formula:

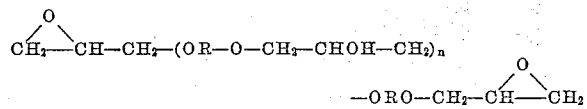

are mainly concerned, when bi-valent alcohols or phenols are used, wherein R represents the alcohol or phenol radical and $n$ is dependent on the mixing ratio of the components; $n$ is either 0 or a low positive whole number. The content of condensates in epoxide groups may be determined analytically in known manner.

Hardened resinous products may be obtained from the above-mentioned condensates, as known, by addition of hardening agents. The objects of the invention is to harden these condensates by means of those compounds by which the resinous products resulting during the hardening are dyed. It was found that to achieve this object basic or nitrogenous dyestuffs are suitable and as condensates to be hardened those are principally concerned which are prepared from epichlorhydrin or dichlorhydrin and bis-(4-oxyphenyl)-2:2-propane (bis-phenol) in a molecular ratio of about 1-3 epichlorhydrin or dichlorhydrin to 1 bisphenol in alkaline medium which contains alkali in a quantity equivalent to the chlorine content of the reaction mixture or in slight excess thereof. As examples of dyestuffs which are suitable for the hardening of the above-mentioned condensates, there may be mentioned: malachite green, crystal violet, fuchsin, victoria blue and methyl green of the triaryl methane dyestuffs; the lautsche violet and methylene blue of the thiazines, safranin T of the azines and finally toluylene blue of the indamines.

With the said dyestuffs the condensates stated are mixed and heated in known manner for the hardening. As a result of the primary, secondary or tertiary nitrogen contained in the dyestuffs, the setting of the condensates is effected by reaction with the free epoxide groups or by catalytic influence. Whilst hardening the dyestuffs contain, as was surprisingly discovered, the property of staining in spite of the partial chemical conversion which they experience with the condensate, so that the resinous products resulting during the hardening are also dyed. The dyestuffs may be suspended in the condensate or dispersed or added as solution.

The method of the invention may be carried out, for example, by adding one of the said dyestuffs in powder form to the condensate which is present in liquid form and is to be hardened, the reaction components thoroughly mixed and the mixture heated to 120–130°. The dyestuff is used in quantities up to about 20% of the condensate. Since the dyestuffs mentioned are dye-salts insoluble in the condensates to be hardened, resinous products result when this form of carrying out the method of the invention is used, said products being hardened and coloured but not clear. The products may be used as hardenable cast resins.

The method of the invention may also be carried out by dissolving the condensate and the dyestuff, combining the solutions, concentrating the solutions, if preferred, this being possible without the dyestuff being again precipitated out and then the mixture of solutions being poured as foils or applied to an object such as glass plates or foils to be coated by pouring, brushing, spraying or dipping and hardened by comparatively long heating at elevated temperature. The solutions or mixture of solvents yield after setting clear transparent films with particularly excellent brilliance and colour. The colour is dependent on the thickness of the layer. Such solutions have various uses, such as lacquer for paints on windows (church windows), tiles and the like, also as paints on metals. As solvents for the condensates and dyestuffs, ketones and alcohols such as acetone, methyl-ethyl ketone, methyl-isopropyl ketone, methyl-isobutyl ketone, diacetone alcohol are particularly suitable. Such solutions may be diluted with aliphatic alcohols, such as butanol and aromatic hydrocarbon such as toluol.

The degree of hardening achieved may be ascertained by fusion and dissolving tests. The hardened resinous products can no longer be melted down, but decompose when heated to comparatively high temperatures and are no longer soluble in the solvents in which the condensates were readily soluble.

A condensate suitable for the method for the invention may be prepared in the following manner:

4.56 kg. diphenylol propane are dissolved in a solution of 13.2 kg. water and 3.31 kg. NaOH and filtered hot. After cooling to 45° 2.96 kg. epichlorohydrin are added with stirring in one pouring. The mixture is allowed to stand during which the temperature rises. After the temperature has dropped, the mixture is heated so that it rises to about 102° within 80 minutes and is then kept at this temperature for one hour. Then the precipitated resin is washed at 95–97°, supernatent water being drawn off and condensate water continuously fed until the neutral point is reached. The supernatent solution is drawn off and the resin dried in an external temperature of 140° with stirring. A condensate results having an epoxide equivalent of 515 and a softening point of 70°. The resin dissolves clear in diacetone-alcohol-toluol mixture. From this condensate, as also from other condensates of the above stated kind, hardened and simultaneously dyed resinous condensation products are produced as follows:

*Example 1*

24 g. condensate are dissolved in a mixture of 12.3 g. diactone alcohol and 12.3 g. toluol. 20 g. of this solution are mixed with a solution of 1 g. crystal violet in 30 cc. diacetone alcohol. The mixture of solutions is concentrated to about half in a shallow dish. The solution is then applied to a glass plate and hardened for 16 hours at 120° and a further 16 hours at 130°. A clear transparent, violet-red, lustrous film is produced adhering firmly to the glass plate. If a sample is carefully heated, it becomes apparent that it is neither meltable nor soluble.

*Example 2*

10 g. of condensate and 2 g. of finely pulverised methylene blue are mixed together hot and the mixture added to a flat mould. Hardening is achieved by heating to 120° for 16 hours. A blue foil results which is no longer meltable and no longer soluble in solvents capable of dissolving the condensate.

Example 3

10 g. of condensate and 2 g. of finely pulverised malachite green are mixed and poured into a mould. Hardening is effected by heating to 130° for 16 hours. The hardened resinous product is dyed green and no longer meltable and no longer soluble in solvents in which the condensate is soluble.

Example 4

A solution is prepared by dissolving a 1,000 g. of condensate in a mixture of 510 g. diacetone alcohol and 510 g. toluol. 10 g. of this solution are mixed with a solution of 0.25 g. victoria blue which is dissolved in 15 cc. ethanol. After the mixture of solvents has been concentrated by careful heating until it is readily workable, the solution is applied to a glass plate and hardened for a total of 30 hours with a slowly rising temperature from 80 to 125°. A clear and transparent blue film of hardened epoxide resin condensate results.

Example 5

10 g. of condensate solution mentioned in Example 4 are mixed with a solution of 0.25 g. toluylene blue in 30 cc. ethanol. This solution, after concentrating and applying to a glass plate, is set by being kept at 80° for 23 hours, 100° for 5 hours and 125° for 2 hours. The hardened film is purple red, clear and lustrous. The film is no longer meltable and no longer soluble in solvents capable of dissolving the condensate.

Example 6

A solution of 0.25 g. safranin T in 25 cc. ethanol was admixtured to 10 g. of the epoxide resin solution mentioned in Example 4 and, after concentration of the solution an application to a glass plate, hardening effected as stated in Example 5. The hardened film was reddish violet.

Hardened and coloured epoxide resin with methyl green was produced under the same conditions as stated in Examples 5 and 6.

What I claim is:

1. A method of dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing the condensate with a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture to a temperature at which the mixture is hardened, whereby said mixture is simultaneously dyed and hardened.

2. A method of simultaneously dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing the condensate with from about 5 to at the most 25% by weight, based on the weight of the condensate of a dyestuff selected from the group consisting of triarylmethane dyes, thiazine dyes, azine dyes and indamine dyes, said dyestuff containing a nitrogen selected from the group consisting of primary, secondary and tertiary nitrogen atoms; and heating the resulting mixture to a temperature above 80° up to about 130° C. thereby dyeing and hardening the mixture simultaneously.

3. A method of simultaneously dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing an organic solution of the condensate with an organic solution of a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture to a temperature above 80° and up to about 130° C., dyeing and hardening the same concurrently.

4. A method of simultaneously dyeing and hardening a hardenable resinous condensate of a member selected from the group consisting of epichlorohydrin and dichlorohydrin, with at least one member selected from the group consisting of a polyhydric alcohol and a polyhydric phenol, said condensate having on an average, more than one epoxy group per molecule, which method consists essentially of mixing the condensate in the liquid state with a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture, to a temperature above 80° and up to about 130° C. and dyeing the same concurrently.

5. A method of dyeing and hardening a hardenable epoxy groups-containing resinous condensate obtained by condensing from 1 to 3 mols selected from the group consisting of epichlorohydrin and dichlorohydrin with about 1 mole of diphenylolpropane in the presence of a quantity of alkali approximately equivalent to the chlorine content, which method consists essentially of mixing the condensate with a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture to a temperature above 80° and up to about 130° C., thereby dyeing and hardening the same simultaneously.

6. A method of dyeing and hardening a hardenable epoxy groups-containing resinous condensate of epichlorohydrin with diphenylol propane, which method consists essentially of mixing the condensate with a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture to above 80° C. and up to about 130° C., thereby dyeing and hardening the same simultaneously.

7. A method of dyeing and hardening a hardenable epoxy groups-containing resinous condensate of dichlorohydrin with diphenylol propane, which method consists essentially of mixing the condensate with a dyestuff selected from the group consisting of triarylmethane dyes, thiazine dyes, azine dyes and indamine dyes, said dyestuff containing nitrogen selected from the group consisting of primary, secondary and tertiary nitrogen atoms; and heating the resulting mixture to above 80° C. and up to about 130° C., thereby dyeing and hardening the same simultaneously.

8. A method of dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing the condensate in the liquid state with a triarylmethane dyestuff containing nitrogen selected from the group consisting of primary, secondary and tertiary nitrogen atoms, and heating the resulting mixture to a temperature at which the mixture is hardened, thereby dyeing and hardening the same concurrently.

9. A method of dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing the condensate with from about 5 to at the most 25% by weight, based on the weight of the condensate, of a triarylmethane dyestuff containing nitrogen selected from the group consisting of primary, secondary and tertiary nitrogen atoms, and heating the resulting mixture to a temperature within the range from above 80° C. to about 130° C., thereby hardening and dyeing the mixture simultaneously.

10. A method of simultaneously dyeing and hardening a hardenable epoxy groups-containing resinous condensate of a member selected from the group consisting of epichlorohydrin and dichlorohydrin with at least one member selected from the group consisting of a polyhydric alcohol and a polyhydric phenol, which method consists essentially of mixing an organic solution of the condensate with an organic solution of a triarylmethane dyestuff containing nitrogen selected from the group consisting of primary, secondary and tertiary nitrogen atoms, and heating the resulting mixture to a temperature above 80° C. up to about 130° C., thereby hardening and dyeing the same.

11. A method of simultaneously dyeing and hardening a hardenable epoxy groups-containing resinous condensate obtained by condensing from 1 to 3 moles of a member selected from the group consisting of epichlorohydrin and dichlorohydrin with about 1 mole of diphenylpropane in the presence of a quantity of alkali approximately equivalent to the chlorine content, which method consists essentially of mixing the condensate with a triarylmethane dyestuff containing nitrogen selected from the group consisting of primary, secondary and tertiary nitrogen atoms, and heating the resulting mixture to a temperature above 80° C. and up to about 130° C., thereby dyeing and hardening the same concurrently.

12. A method of simultaneously dyeing and hardening a hardenable epoxy groups-containing resinous condensate of epichlorohydrin with diphenylol propane; which method consists essentially of mixing the condensate with a triarylmethane dyestuff containing nitrogen selected from the group consisting of primary, secondary and tertiary nitrogen atoms, and heating the resulting mixture to a temperature above 80° and up to about 130° C., thereby dyeing and hardening the same concurrently.

13. A method of simultaneously dyeing and hardening a hardenable epoxy groups-containing resinous condensate of cichlorohydrin with diphenylol propane; which method consists essentially of mixing the condensate with a triarylmethane dyestuff containing nitrogen selected from the group consisting of primary, secondary and tertiary nitrogen atoms, and heating the resulting mixture to a temperature above 80° and up to about 130° C., thereby dyeing and hardening the same concurrently.

14. A method of dyeing and hardening a hardenable epoxy groups-containing resinous condensate of epichlorohydrin with diphenylol propane which method consists essentially of mixing the condensate with malachite green, and heating the resulting mixture to above 80° up to about 130° C., thereby dyeing and hardening the same concurrently.

15. A method of dyeing and hardening a hardenable epoxy groups-containing resinous condensate of epichlorohydrin with diphenylol propane which method consists essentially of mixing the condensate with crystal violet, and heating the resulting mixture to above 80° up to about 130° C., thereby dyeing and hardening the same concurrently.

16. A method of dyeing and hardening a hardenable epoxy groups-containing resinous condensate of epichlorohydrin with diphenylol propane which method consists essentially of mixing the condensate with fuchsin, and heating the resulting mixture to above 80° up to about 130° C., thereby dyeing and hardening the same concurrently.

17. A method of dyeing and hardening a hardenable epoxy groups-containing resinous condensate of epichlorohydrin with diphenylol propane which method consists essentially of mixing the condensate with victoria blue, and heating the resulting mixture to above 80° up to about 130° C., thereby dyeing and hardening the same concurrently.

18. A method of dyeing and hardening a hardenable epoxy groups-containing resinous condensate of epichlorohydrin with diphenylol propane which method consists essentially of mixing the condensate with methyl green, and heating the resulting mixture to above 80° up to about 130° C., thereby dyeing and hardening the same concurrently.

19. A method of dyeing and hardening a hardenable epoxy groups-containing resinous condensate of epichlorohydrin with diphenylol propane which method consists essentially of mixing the condensate with lautsche violet, and heating the resulting mixture to above 80° up to about 130° C., thereby dyeing and hardening the same concurrently.

20. A method of dyeing and hardening a hardenable epoxy groups-containing resinous condensate of epichlorohydrin with diphenylol propane which method consists essentially of mixing the condensate with methylene blue, and heating the resulting mixture to above 80° up to about 130° C., thereby dyeing and hardening the same concurrently.

21. A method of dyeing and hardening a hardenable epoxy groups-containing resinous condensate of epichlorohydrin with diphenylol propane which method consists essentially of mixing the condensate with safranin T, and heating the resulting mixture to above 80° up to about 130° C., thereby dyeing and hardenig the same concurrently.

22. A method of dyeing and hardening a hardenable epoxy groups-containing resinous condensate of epichlorohydrin with diphenylol propane which method consists essentially of mixing the condensate with toluylene blue, and heating the resulting mixture to above 80° up to about 130° C., thereby dyeing and hardening the same concurrently.

References Cited in the file of this patent

UNITED STATES PATENTS

| 2,444,333 | Castan | June 29, 1948 |
| 2,717,885 | Greenlee | Sept. 13, 1955 |

OTHER REFERENCES

Karrer: Organic Chemistry, 2nd edition, Elsevier Publishing Co., New York, N.Y., 1946, pages 568–611.

Marmion, Epoxide Resins, Research (London), pages 351–355, volume 7, 1954.

Schildknecht, Polymer Processes, copyrighted Feb. 28, 1956, Interscience Publishers Inc., New York, pp. 439–450 and 457–459.